United States Patent
Vighagen

(10) Patent No.: US 12,103,210 B2
(45) Date of Patent: Oct. 1, 2024

(54) INNER MOLD TOOL

(71) Applicant: Tetra Laval Holdings & Finance S.A., Pully (CH)

(72) Inventor: Peter Vighagen, Hörby (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 245 days.

(21) Appl. No.: 17/422,853

(22) PCT Filed: Feb. 7, 2020

(86) PCT No.: PCT/EP2020/053075
§ 371 (c)(1),
(2) Date: Jul. 14, 2021

(87) PCT Pub. No.: WO2020/165028
PCT Pub. Date: Aug. 20, 2020

(65) Prior Publication Data
US 2022/0097268 A1 Mar. 31, 2022

(30) Foreign Application Priority Data

Feb. 15, 2019 (EP) ..................................... 19157507

(51) Int. Cl.
*B29C 45/14* (2006.01)
*B29C 45/04* (2006.01)
(Continued)

(52) U.S. Cl.
CPC ........ *B29C 45/2612* (2013.01); *B29C 45/045* (2013.01); *B29C 45/14336* (2013.01);
(Continued)

(58) Field of Classification Search
CPC .. B29C 45/2612; B29C 45/2618; B29C 45/36
See application file for complete search history.

(56) References Cited

U.S. PATENT DOCUMENTS 2,891,283 A * 6/1959 Chabotte ................. B29C 45/33
425/436 RM
3,159,701 A * 12/1964 Herter ..................... B29C 45/26
425/129.1
(Continued)

FOREIGN PATENT DOCUMENTS

JP S57205129 A 12/1982
JP 02011311 * 1/1990
(Continued)

OTHER PUBLICATIONS

International Search Report and Written Opinion issued Apr. 14, 2020, for International Patent Application No. PCT/EP2020/053075.
(Continued)

*Primary Examiner* — Edmund H Lee
(74) *Attorney, Agent, or Firm* — Renner, Otto, Boisselle & Sklar, LLP

(57) ABSTRACT

An inner mould tool forming part of a mould to be used during injection moulding of plastic articles, such as plastic tops for liquid food packages, is provided. The inner mould tool comprises an outer surface defining the interior surface of the plastic article to be produced, wherein the longitudinal end of the inner mould tool is provided with a bushing having a planar surface defining the longitudinal end of the inner mould tool and being configured to be in contact with mating outer mould tools during injection moulding. The bushing is provided with side walls extending from the planar surface, said side walls forming part of the outer surface of the inner mould tool.

9 Claims, 7 Drawing Sheets

(51) Int. Cl.
   *B29C 45/26*   (2006.01)
   *B29K 711/12*   (2006.01)
   *B29L 31/00*   (2006.01)
(52) U.S. Cl.
   CPC .. *B29C 45/14598* (2013.01); *B29C 45/14778* (2013.01); *B29C 45/2618* (2013.01); *B29K 2711/123* (2013.01); *B29K 2995/0094* (2013.01); *B29L 2031/7166* (2013.01)

(56)          References Cited

U.S. PATENT DOCUMENTS

| 4,518,554 | A | | 5/1985 | Hatakeyama et al. |
| 5,352,398 | A | * | 10/1994 | Crowe ................... B29C 33/02 |
| | | | | 264/335 |
| 7,429,348 | B2 | * | 9/2008 | Soerensen ........... B29C 45/5605 |
| | | | | 425/577 |
| 2005/0112309 | A1 | * | 5/2005 | Soerensen ........... B29C 45/5605 |
| | | | | 264/328.2 |

FOREIGN PATENT DOCUMENTS

| JP | 04136520 | * | 5/1992 |
| JP | H05162174 A | | 6/1993 |
| JP | H05337982 A | | 12/1993 |
| JP | 20001113567 | * | 4/2001 |
| JP | 2277258 | * | 10/2006 |

OTHER PUBLICATIONS

Yury Shiskov; Tetra Top 3 Filling Machine; Jun. 23, 2017; XP055608033; https://www.youtube.com/watch?v=LNtvz7-aG4g; figures 1-6.

* cited by examiner

INNER MOLD TOOL

This application is a national phase of International Application No. PCT/EP2020/053075 filed Feb. 7, 2020, which claims priority to European Patent Application No. 19157507.5 filed Feb. 15, 2019.

TECHNICAL FIELD

The invention relates to a mould, and in particular to a mould used for injection moulding. The present invention also relates to tools forming part of such mould.

BACKGROUND ART

Injection moulding is a well-known process used to manufacture articles by injecting a molten material into a mould and allowing the material to harden before it is removed from the mould. During recent years, injection moulding technology has spread to the packaging industry where it can be used to produce packaging containers having plastic parts injection moulded over carton-based sleeves.

Such packages, combining the environmental benefits of carton-based packages with the structural benefits of plastic tops, have been particularly successful for packages storing liquid food. One such example is the Tetra Top® package and its various shapes.

When producing such a package, an open-ended sleeve made of a carton-based material is arranged onto a mandrel. One end of the mandrel, which extends axially from the end of the sleeve, forms an inner mould tool during injection moulding of the plastic top. Two outer mould tools move towards the inner mould tool in order to form a cavity in the shape of the plastic top to be produced. Once the outer mould tools reach their operational position relative the inner mould tool, injection moulding is performed whereby the plastic top is produced directly onto the carton-based sleeve. Once the outer mould tools are separated, and moving away from the inner mould tool, the carton-based sleeve can be removed from the mandrel. At this point the open-ended sleeve is provided with a plastic top which in turn is sealed using e.g. a threaded cap. Filling of the package can then be performed through the open bottom end, before the bottom end is sealed and formed into a suitable, often planar, shape.

The outer mould tools are moving towards the inner mould tool in a plane, as the mandrel carrying the inner mould tool is rotating towards its injection moulding position. In this position the mandrel is arranged vertically, which means that the outer mould tools are moving upwards, as well as towards the inner mould tool in the horizontal direction to reach their operational position. In order to produce a plastic top having the required dimensions, the outer mould tools must be aligned with the inner mould tool in the vertical direction as well as in the horizontal plane. For the purpose of alignment in the vertical plane the upper part of the inner mould tool is provided with a bushing that comes into contact with the outer mould tools and thus provides vertical guidance of the outer mould tools. Horizontal alignment between the inner and outer mould tools is provided by the entire lid forming unit as shown in FIG. 1.

The packages mentioned above are typically manufactured in high speed filling machines; the entire injection moulding process for one plastic top is performed in around 1.5 seconds. Due to the high-speed application, requiring very fast cooling of the mould, the outer mould tools are normally made of aluminum. Any misalignment between the outer mould tools and the bushing of the inner mould tool will result in wear of the outer mould tools, which eventually will cause leakage of the injection moulding material outside the intended dimensions of the plastic top. The injection moulding fault will occur as burr at the upper end of the plastic top, i.e. at the edge of the pouring spout of the package. Since the edge of the pouring spout is in direct contact with the lips of a consumer, especially for smaller packages, it is highly desired to avoid burrs.

One solution is to replace the outer mould tools more frequently, before wear introduces burrs. However, it would be more desirable to provide an improved mould reducing the risk for burrs and thereby extending the life time of the mould tools as well as increasing the safety to consumers consuming foods directly from packages with a carton laminate and injections moulded parts.

SUMMARY

It is an object of the invention to at least partly overcome one or more of the above-identified limitations of the prior art.

To solve these objects an inner mould tool is provided. The inner mould tool forms part of a mould to be used during injection moulding of plastic articles, such as plastic tops for liquid food packages. The inner mould tool comprises an outer surface defining the interior surface of the plastic article to be produced, wherein the longitudinal end of the inner mould tool is provided with a bushing having a planar surface defining the longitudinal end of the inner mould tool and being configured to be in contact with mating outer mould tools during injection moulding. The bushing is provided with side walls extending from the planar surface, said side walls forming part of the outer surface of the inner mould tool.

The bushing may have a cylindrical shape, which is advantageous in that the entire circumference of the bushing can be used to define the article to be injection moulded.

The bushing may be supported by at least one spring biasing the bushing to a longitudinally extended position. This way the risk of wear of the outer moulding tools is reduced, since the contact area between the bushing and the outer tools is increased and only occurs in a horizontal plane.

The inner mould tool may comprise a neck part and a spout part, wherein the side walls of the bushing form the longitudinal end of the spout part. The bushing thereby terminates the cavity of the mould, thereby reducing the risk of burrs at the spout of the package.

The bushing may project longitudinally from a main body of the inner mould tool, and the radius of the bushing may be less than the radius of the main body. The bushing can thereby move inside the main body, which means that the bushing is guided by the main body during its motion.

The bushing may be attached to the main body of the inner mould tool by means of one or more screws. Robust securing of the bushing is thereby accomplished.

According to a second aspect, a mould to be used during injection moulding of plastic articles, such as plastic tops for liquid food packages, is provided. The mould comprises an inner mould tool and at least two outer mould tools, said mould tools together defining a cavity to receive molten plastic material during injection moulding. The longitudinal end of the inner mould tool is provided with a bushing having a planar surface defining the longitudinal end of the inner mould tool and being configured to be in contact with mating outer mould tools during injection moulding. The bushing is provided with side walls extending from the planar surface, said side walls being arranged at a distance from the outer mould tools during injection moulding.

The distance between the side walls of the bushing and the outer mould tools may form part of the injection moulding cavity, which is advantageous in that there are no parts of the side walls of the bushing acting as guiding surfaces for the outer mould tools.

The inner mould tool may be arranged on a mandrel which is configured to receive a sleeve of a packaging material onto which the plastic article is to be injection moulded, wherein the outer mould tools are configured to be in contact with the outer surface of the sleeve during injection moulding. Efficient and reliable guidance of the outer mould tools is thereby achieved.

The outer mould tools may be guided by the planar surface of the bushing in a first direction, and by the outer surface of the sleeve in a second direction. This provides for sufficient guidance of the outer mould tools, in all necessary directions.

According to a third aspect, a method for injection moulding a plastic article onto a sleeve of a packaging material is provided. The method comprises arranging the sleeve of packaging material onto a mandrel, moving two outer mould tools towards an inner mould tool being arranged on said mandrel, pressing said outer mould tools against the inner mould tool whereby the outer mould tools are guided in a first direction by a planar surface of a bushing provided on the inner mould tool, and in a second direction only by the outer surface of the sleeve, and injecting molten plastic material into a cavity formed between the inner mould tool and the outer mould tools.

The first guiding direction may be arranged perpendicular to the second guiding direction, which provides for efficient and reliable guidance of the outer mould tools in all required dimensions.

Pressing said outer mould tools against the inner mould tool may be performed such that the bushing is pushed towards the sleeve of packaging material in the longitudinal direction of the sleeve.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
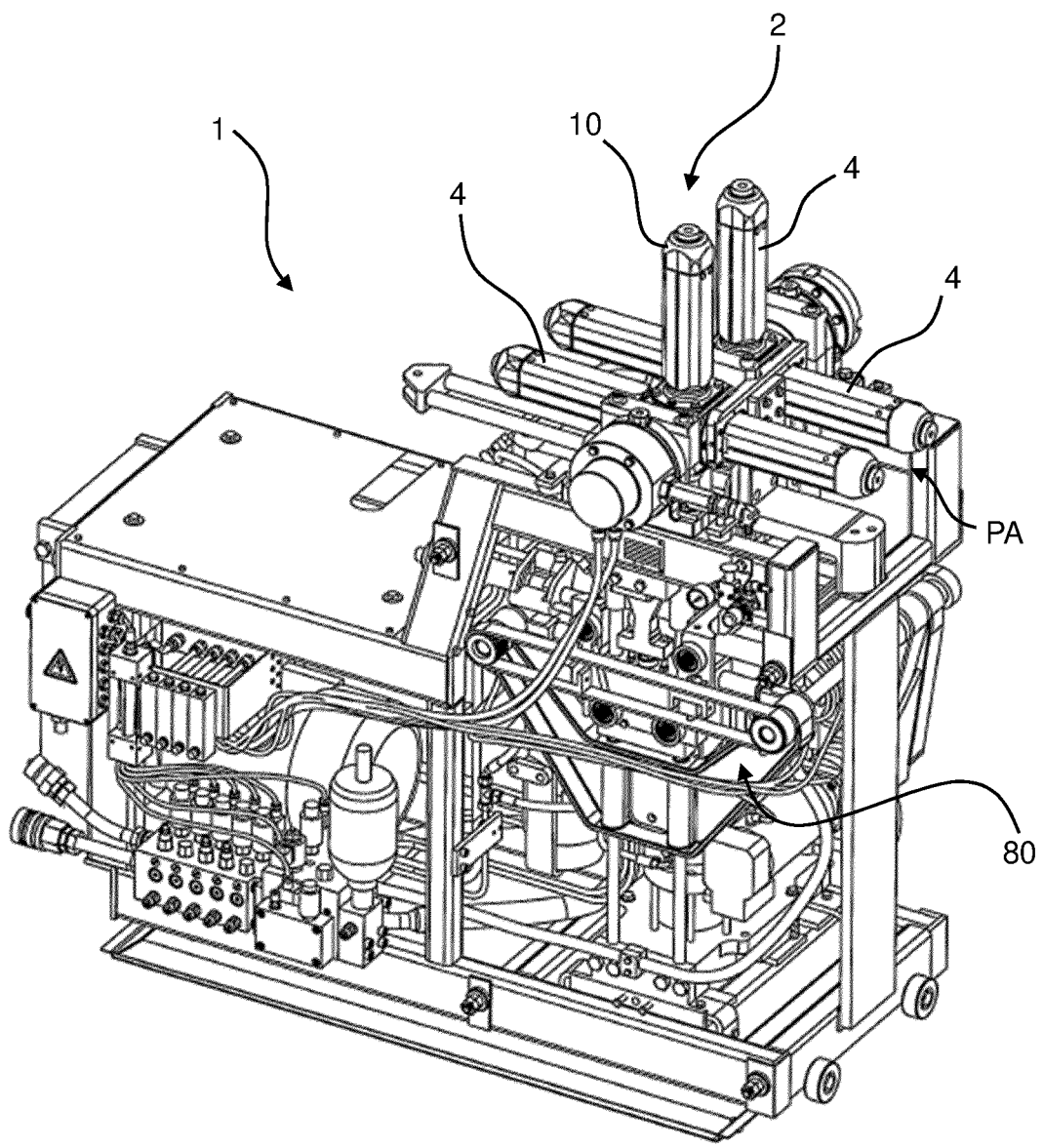
FIG. 1 is an isometric view of an injection moulding station of a filling machine.

In FIG. 1, a non-limiting example of an injection moulding station 1 is shown which may be incorporated in a filling machine (not shown). The term filling machine is used to characterize a machine which is configured to receive a carton-based packaging material laminate on a roll or in the form of individual blanks, to perform necessary operations to form a sleeve or a packaging container for containing a food product under certain hygienic requirements and to finally seal the packaging container for further distribution.

In the present case, the filling machine is typically configured to produce individual consumer packages enclosing liquid food, while the injection moulding station 1 is configured to a plastic top on a sleeve made from a carton-based packaging material, with a plastic top.

Two parallel mandrel wheels 2 are provided in the top right part of the machine 1. Each mandrel wheel 2 carries four mandrels 4, spaced apart by 90° in the same plane. Each mandrel has a longitudinal extension in the radial direction of the associated mandrel wheel 2 and terminates by means of an inner mould tool 10. During operation, the mandrel wheels 2 are rotating. At one position, e.g. where the mandrels 4 are pointing to the right in the figure (indicated by reference PA), sleeves of a packaging material are fed onto the mandrels 4. As the mandrel wheels 2 are rotating clock wise, the next position of the mandrels 4 is the injection moulding position, further shown in FIG. 2.

In the next consecutive position, cooling of the injection moulded articles can occur, whereby the sleeves (and their associated plastic tops) can be withdrawn from the mandrels 4.

Figure 2:
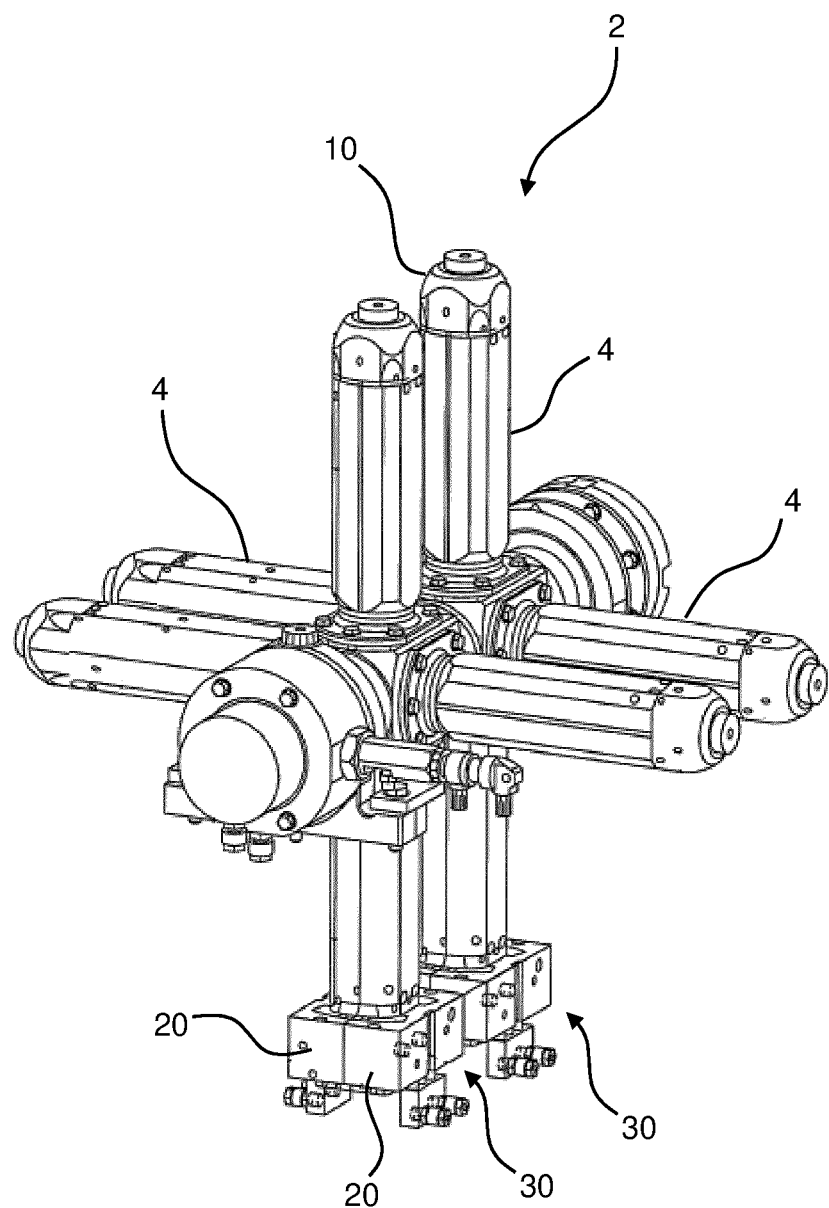
FIG. 2 is an isometric view of two parallel moulds of the injection moulding station shown in FIG. 1.

Now turning to FIG. 2, moulds 30 are formed at the injection moulding position. Each mould 30 comprises an inner mould tool 10, i.e. the longitudinal end portion of the mandrel 4, and two moveable outer mould tools 20.

In the injection moulding position, indicated in FIG. 2, the outer mould tools 20 are arranged in close proximity to the inner mould tool 10 so that a cavity is formed between them, receiving molten plastic material in accordance with available injection moulding techniques.

Figure 3:
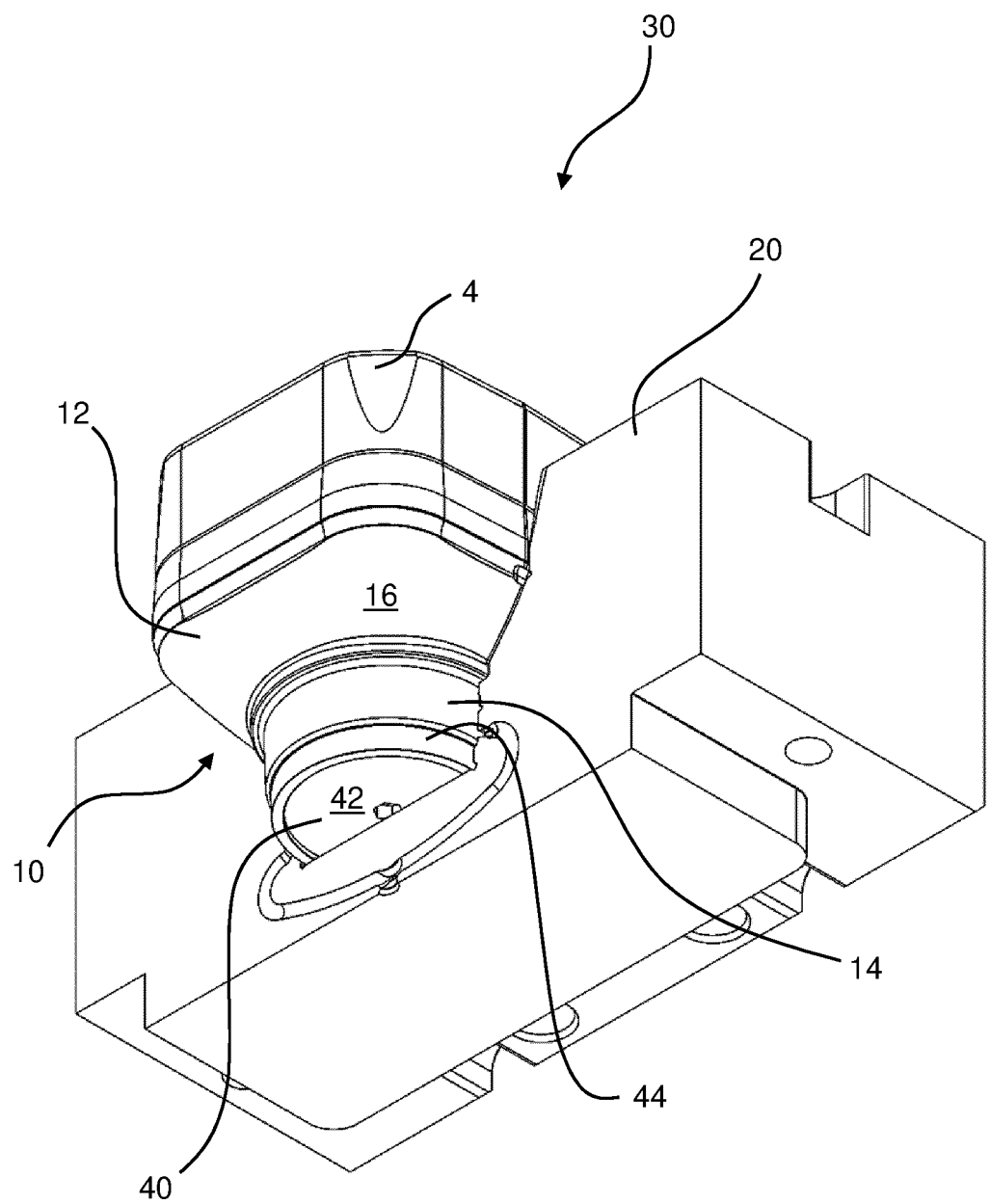
FIG. 3 is an isometric view of parts of a mould according to an embodiment.

In FIG. 3 the mould 30 is shown in a cross-section where one outer mould tool 20 has been omitted for the purpose of facilitating understanding. The inner mould tool 10 is arranged at a longitudinal end of the mandrel 4, as explained above. The mandrel 4 has a rectangular cross-section, although with rounded corners, in order to define the shape of the carton-based package. The inner mould tool 10 has a neck part 12, which extends into a spout part 14. The distal end of the spout part 14 is formed by means of a bushing 40. The bushing 40 is provided with side walls 44 which thereby form the longitudinal end of the spout part 14.

The inner mould tool 10 comprises an outer surface 16 which defines the interior surface of the plastic article to be produced, i.e. the plastic top in the described embodiment. The bushing 40 has a planar surface 42 that defines the longitudinal end of the inner mould tool 10, and which extends between the side walls 44. During injection moulding, the planar surface 42 is in contact with the mating outer mould tools 20.

Figure 4:
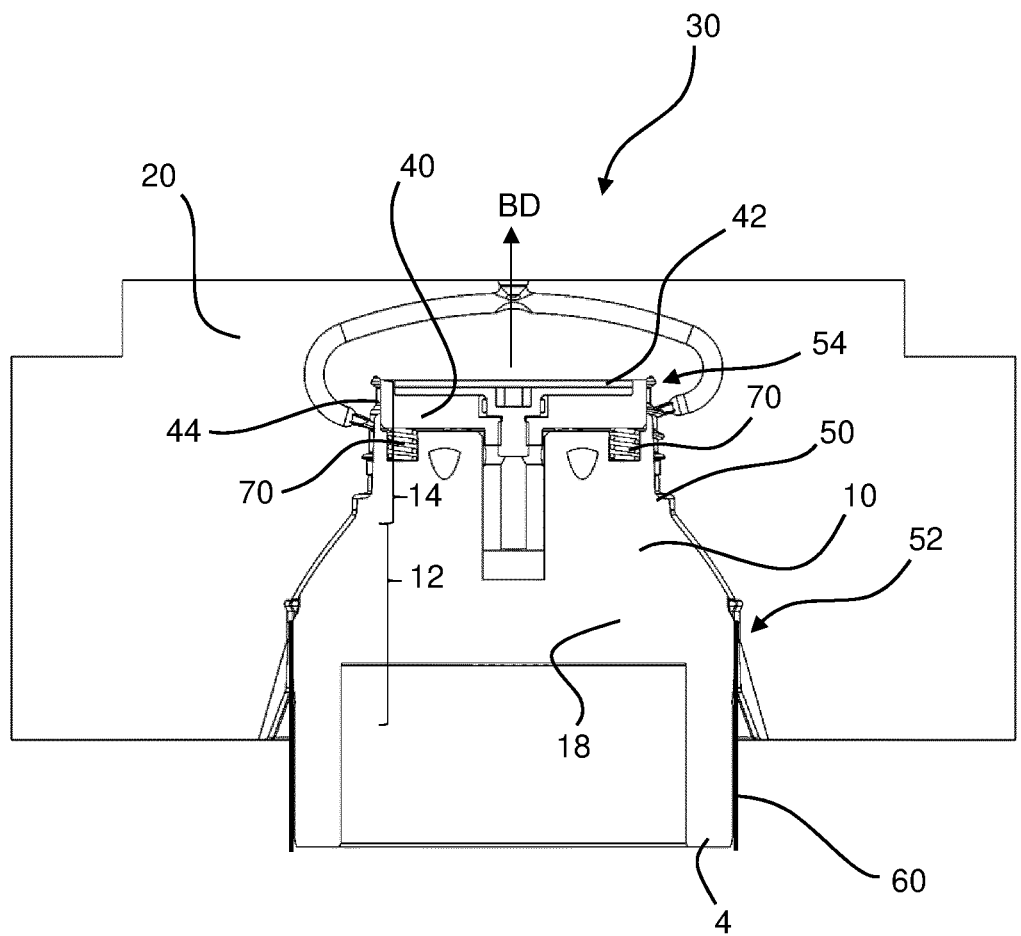
FIG. 4 is a cross-sectional view of a mould according to an embodiment.

Now turning to FIG. 4 the mould 30 is shown in a cross-section. A cavity 50 is formed inside the mould 30, which cavity is defining the shape of the article to be produced. In this embodiment, the cavity has a ring-shaped cross-section to define the neck and spout of a plastic top. The cavity 50 has a bottom portion 52 which forms an interface to the sleeve 60 of carton-based packaging material, only schematically indicated in FIG. 4. The cavity 50 extends over the neck part 12 of the inner mould tool 10, as well as over the spout part 14 of the inner mould tool 10. The cavity 50, which upper end 54 has a circular or ring-shape, terminates at the planar surface 42 of the bushing 40 such that the side walls 44 of the bushing also form the boundaries of the cavity 50. Thereby the side walls 44 of the bushing 40 form part of the outer surface 16 of the inner mould tool 10.

The bushing 40 has a cylindrical shape and extends downwards (in a direction opposite direction of the axis BD in FIG. 4) in a T-shape. One benefit of the T-shape is improved longitudinal guidance of the bushing 40. We want to point out here, however, that the bushing 40 will also work without the T-shape., As can be seen in FIG. 4, a plurality of springs 70 are arranged underneath the bushing 40, supporting the bushing 40 relative a main body 18 of the inner mould tool 10. In this exemplary embodiment six compression springs 70 are distributed at an equal angular distance (60°) from each other. However, as is readily understood a different number of compression springs 70 could be used as well as other types of springs (plate springs, etc.).

The springs 70 bias the bushing 40 in a longitudinal direction BD, away from the mandrel 4, to a longitudinally extended position. This longitudinally extended position, as well as the bushing 40 moving, is shown in FIGS. 5a-d.

FIGS. 5a-d show a sequence of the outer mould tools 20 moving from a remote position to an injection moulding position. To fully understand the complex motion of the inner mould tool 10 and the outer mould tools 20, reference is again made to FIGS. 1 and 2. The outer mould tools 20 are moving towards their operational position; during this motion, the inner mould tool 10 is also moving towards the injection moulding position by a rotary motion. This means that the outer mould tools 20 cannot move in a linear manner, but they must be separated from the inner mould tool 10 in the horizontal plane as well as in the longitudinal direction in order to allow the inner mould tool 10 to rotate into its desired position. To achieve this, the motion of the outer mould tools 20 may be controlled by means of a belt drive 80, e.g. as described in WO2004050327 by the same applicant. The belt drive 80 is thereby configured to open and close the mould 30 by moving the outer mould tools 20 in a first direction which is radial in relation to a hub of the mandrel wheels 2 and a second direction which is perpendicular to the first direction and directed in the plane of the circular movement of the inner mould tool 10. Preferably, the outer mould tools 20 are moved so that their central axes coincide throughout the movement. Movement in the first and second directions is preferably performed simultaneously.

Figure 5A:
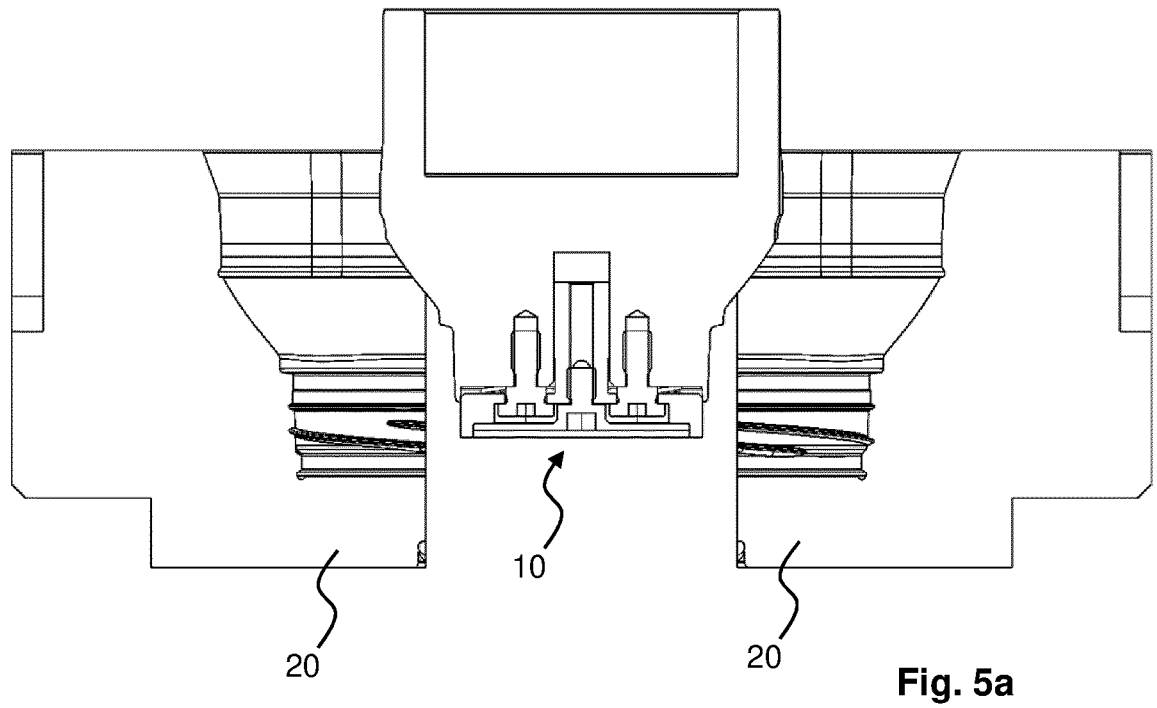
FIGS. 5a-d are cross-sectional views of a mould during a closing sequence, showing the outer mould tools moving towards the inner mould tool in order to define the injection moulding cavity.

In FIG. 5a the position of the outer mould tools 20 is remote from the inner mould tool 10; the shown position corresponds to when the inner mould tool 10 has reached its injection moulding position, but the outer mould tools 20 still have some distance to travel.

Figure 5B:
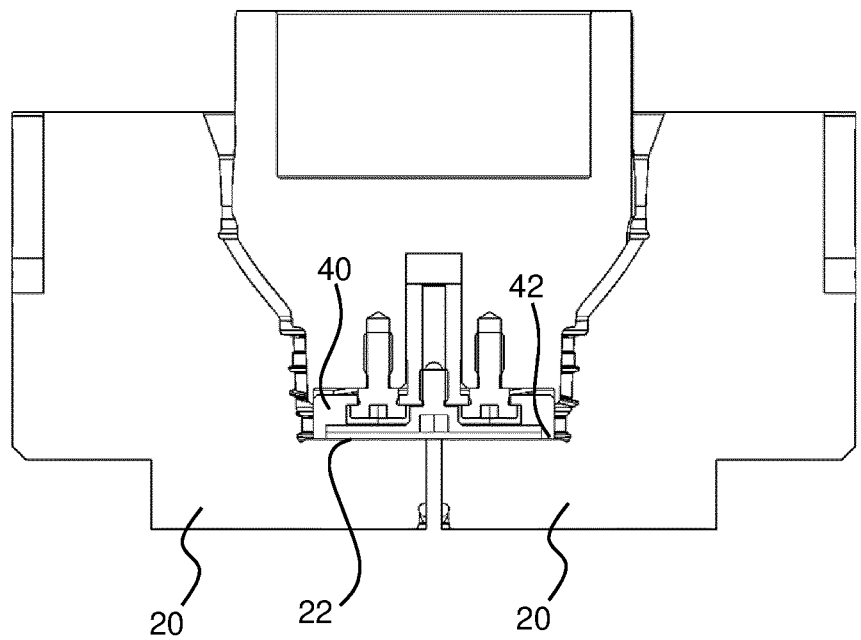

In FIG. 5b, the outer mould tools 20 have reached the inner mould tool 10 such that the planar surface 42 of the bushing 40 is in contact with a mating planar surface 22 of the respective outer mould tool 20. As these planar surfaces 42, 22 are in contact with each other, no cavity is formed in between.

Figure 5C:
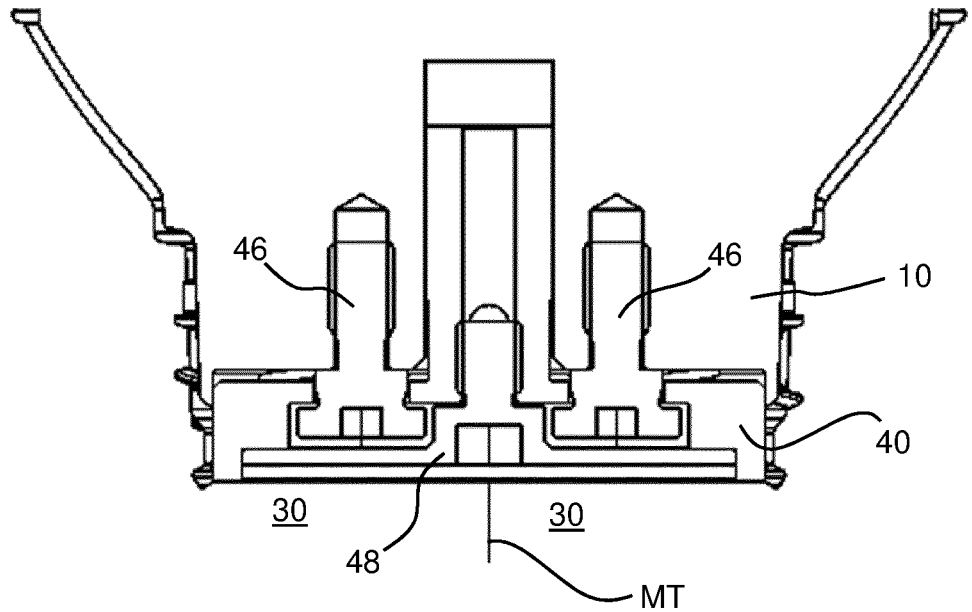

In FIG. 5c the outer mould tools 20 have moved further towards each other in the second direction, i.e. in the horizontal direction, such that the vertical end surfaces of the outer mould tools 20 are pressed towards each other (the interface indicated by reference MT in FIG. 5c). During the motion towards its horizontal end position, each outer mould tool 20 is guided by the sleeve 60 (see FIG. 4). This also means that there are no vertical surfaces of the bushing 40 (i.e. the side walls 44) that comes into contact with vertical surfaces of the outer mould tools 20; this is particularly advantageous for the purpose of reducing wear of the outer mould tools 20. During the step in FIG. 5c as a polymer material intended to form the top of the packaging container is injected into the cavity 50 between the inner 10 and outer mould tools 20.

Figure 5D:
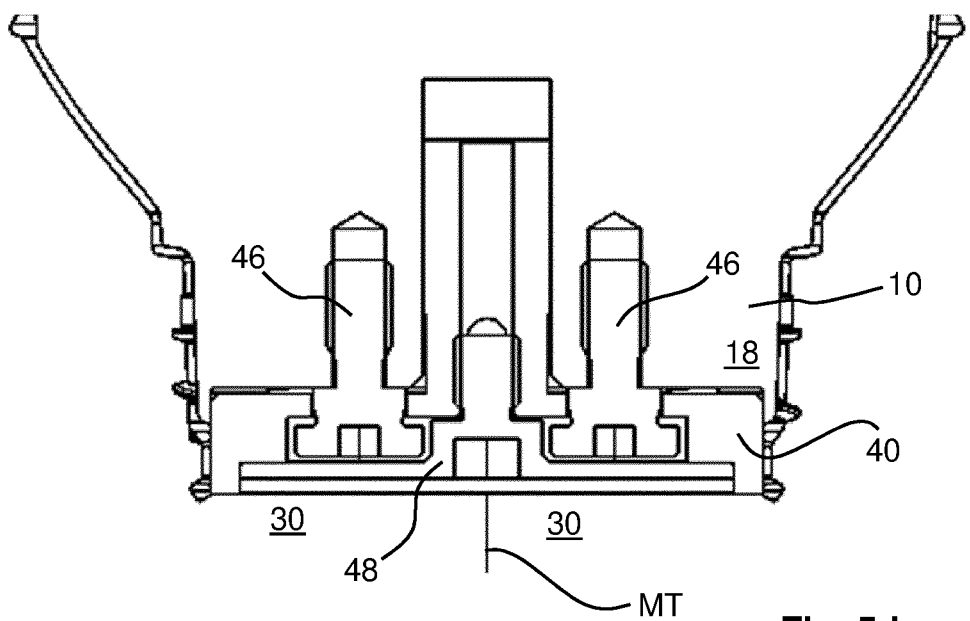

In FIG. 5d the final position of the outer mould tools 20 is shown. Here, the outer mould tools 20 have moved in the vertical direction, thereby pushing the bushing 40 upwards, compressing the springs 70. In this final step of the moulding process, the polymer melt that has been injected into the cavity 50 between the inner 10 and outer tools 20 is pressed between the tools by the movement of the outer mould tools 20 in relation to the inner tool 10 which is fixed. The maximum longitudinal distance for the bushing 40 to move is in the range of 0.2-0.7 mm, such as 0.5 mm. As can be seen in FIG. 5d, the radius of the bushing 40 is less than the radius of the main body 18 of the inner mould 10. The bushing 40 is thereby slidably guided by the main body 18 during its reciprocal motion.

The bushing 40 is attached to the main body 18 of the inner mould tool 10 by means of one or more screws 46. The attachment allows for a robust connection, still making it possible for the bushing 40 to move. The screws 46 are therefore not connected to the bushing by means of a thread, but only determine the final axial position of the bushing 40 (end stop).

A lid 48 may be provided to cover the screws 46.

Figure 6:
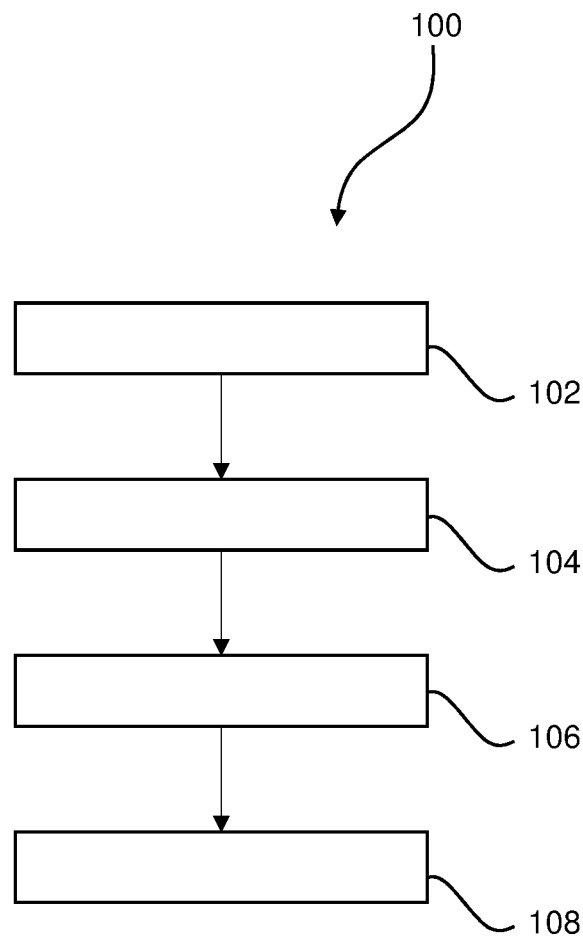
FIG. 6 is a schematic view of a method according to an embodiment.

Now turning to FIG. 6 a method 100 for injection moulding a plastic article onto a sleeve of a packaging material is schematically shown. The method 100 comprises a first step 102 of arranging the sleeve of packaging material onto a mandrel, and a second step 104 of moving two outer mould tools towards an inner mould tool being arranged on said mandrel. In a step 106 a molten polymer material is injected into the cavity formed between the inner mould tool and the outer mould tools when the two outer mould tools have come into contact with each other. Finally, in step 108 the outer mould tools are pressed against the inner mould tool whereby the outer mould tools are guided in a first direction by a planar surface of a bushing provided on the inner mould tool, and in a second direction only by the outer surface of the sleeve. In this step 108, the molten polymer material is pressed inside cavity formed between the inner mould tool and the outer mould tools by the movement of the outer tools against the inner tool.

From the description above follows that, although various embodiments of the invention have been described and shown, the invention is not restricted thereto, but may also be embodied in other ways within the scope of the subject-matter defined in the following claims.

The invention claimed is:

1. An inner mould tool forming part of a mould to be used during injection moulding of a plastic article, wherein the inner mould tool comprises an outer surface defining the interior surface of the plastic article to be produced, wherein the longitudinal end of the inner mould tool is provided with a bushing having a planar surface defining the longitudinal end of the inner mould tool and being configured to be in contact with mating outer mould tools during injection moulding, the bushing being provided with side walls extending from the planar surface, said side walls forming part of the outer surface of the inner mould tool, wherein the inner mould tool comprises a neck part and a spout part, wherein the spout part is configured to form a pouring spout of the plastic article, and the neck part is configured to form a neck of the plastic article, the neck being located between the pouring spout and a body portion of the plastic article, and wherein the side walls of the bushing form the longitudinal end of the spout part.

2. The inner mould tool according to claim 1, wherein the bushing is supported by at least one spring biasing the bushing to a longitudinally extended position.

3. The inner mould tool according to claim 2, wherein the bushing is projecting longitudinally from a main body of the inner mould tool, and wherein the radius of the bushing is less than the radius of the main body.

4. The inner mould tool according to claim 3, wherein the bushing is attached to the main body of the inner mould tool by means of one or more fastening devices.

5. The inner mould tool according to claim 1, wherein the bushing has a cylindrical shape.

6. A mould to be used during injection moulding of plastic articles, comprising an inner mould tool and at least two outer mould tools, said mould tools together defining a cavity to receive molten plastic material during injection moulding, wherein the longitudinal end of the inner mould tool is provided with a bushing having a planar surface defining the longitudinal end of the inner mould tool and being configured to be in contact with mating outer mould tools during injection moulding, wherein the bushing is provided with side walls extending from the planar surface, said side walls being arranged at a distance from the outer mould tools during injection moulding.

7. The mould according to claim 6, wherein the distance between the side walls of the bushing and the outer mould tools forms part of the injection moulding cavity.

8. The mould according to claim 6, wherein the inner mould tool is arranged on a mandrel which is configured to receive a sleeve of a packaging material onto which the plastic article is to be injection moulded, wherein the outer mould tools are configured to be in contact with the outer surface of the sleeve during injection moulding.

9. The mould according to claim 8, wherein the outer mould tools are guided by the planar surface of the bushing in a first direction, and by the outer surface of the sleeve in a second direction.

* * * * *